United States Patent
Odegard et al.

[11] Patent Number: 5,979,634
[45] Date of Patent: Nov. 9, 1999

[54] INFEED SECTION FOR PACKAGING APPARATUS

[75] Inventors: John C. Odegard, Green Bay; Dominique G. Rateau, Weyauwega; Richard D. Sorenson, Sheboygan; Mark R. Van Rens, DePere, all of Wis.

[73] Assignee: Paper Converting Machine Company, Green Bay, Wis.

[21] Appl. No.: 08/953,142

[22] Filed: Oct. 17, 1997

[51] Int. Cl.$^6$ .................................................. B65G 29/00
[52] U.S. Cl. .................. 198/408; 198/418.5; 198/419.3; 414/788.5
[58] Field of Search ................ 198/418.5, 408, 198/410, 463.6, 419.3, 459.7; 414/798.9, 789.8, 788.4, 788.5

[56] References Cited

U.S. PATENT DOCUMENTS

| | | | |
|---|---|---|---|
| 1,194,990 | 8/1916 | Gaynor | 198/419.3 |
| 3,157,071 | 11/1964 | Pachell | 198/410 |
| 3,618,743 | 11/1971 | Benatar | 198/419.3 |
| 3,887,065 | 6/1975 | Verjux | 198/408 |
| 3,914,919 | 10/1975 | Boissy et al. | 53/61 |
| 4,164,996 | 8/1979 | Tomlinson | 198/415 |
| 4,213,526 | 7/1980 | Graham et al. | 198/400 |
| 4,287,979 | 9/1981 | Molins et al. | 198/419.3 |
| 4,669,600 | 6/1987 | Fluck | 198/408 |
| 4,697,691 | 10/1987 | Zodrow et al. | 198/418.5 |
| 4,832,173 | 5/1989 | Hattori et al. | 198/410 |
| 4,874,078 | 10/1989 | Meyer | 198/409 |
| 5,040,662 | 8/1991 | Clark et al. | 198/408 |
| 5,082,104 | 1/1992 | Marceau | 198/419.3 |
| 5,291,985 | 3/1994 | Spatafora et al. | 198/419.3 |
| 5,301,793 | 4/1994 | Kovacs | 198/415 |
| 5,503,518 | 4/1996 | Scholz | 414/798.9 |

FOREIGN PATENT DOCUMENTS

| | | | |
|---|---|---|---|
| 6607573 | 12/1967 | Netherlands | 198/463.6 |
| 2 061 857B | 5/1981 | United Kingdom . | |

OTHER PUBLICATIONS

Hayssen Catalog for Multi–Flow Multiple Roll Packaging System.
Hayssen Catalog for Multi Flow Series HC–40.
Paper Converting Machine Co. Catalog for Multi Flow FC–Series, printed Aug., 1996.

*Primary Examiner*—Christopher P. Ellis
*Assistant Examiner*—Douglas Hess
*Attorney, Agent, or Firm*—Tilton, Fallon, Lungmus & Chestnut

[57] ABSTRACT

An apparatus for feeding, stacking, and/or upending products includes a pair of indexing star wheels. A conveyor advances a row of products toward an upstream star wheel. One or more products are metered into one of the notches in the upstream star wheel, and the upstream star wheel indexes to transfer the products to the downstream star wheel. The upstream star wheel can stack products by indexing twice before the downstream star wheel indexes. The downstream star wheel indexes to upend the products, and the upended products are moved away from the downstream star wheel.

20 Claims, 12 Drawing Sheets

INFEED SECTION FOR PACKAGING APPARATUS

BACKGROUND

This invention relates to an apparatus for feeding products from a row of products which is being advanced along a path. More particularly, the apparatus meters, stacks, and/or upends groups of incoming products and delivers the groups to downstream equipment.

The invention finds particular utility in connection with packaging machinery. For example, Paper Converting Machine Company of Green Bay, Wis. offers a family of FC machines for packing bundles of products such as rolls of toilet paper and rolls of paper towels. Rolls to be bundled and packaged are advanced toward the machine along one or more lanes. The rolls may be upended, i.e., moved from a cores-down position to a cores-up position, stacked into multiple levels, collated into bundles containing the desired number of rolls, and loaded into a packager which seals each bundle within a plastic wrap.

In certain prior art upending methods, elevated slats on an infeed conveyor are used in conjunction with spring-loaded upper flights to upend the incoming rolls. The rolls are deposited onto the infeed conveyor just ahead of, or behind, the elevated slat. The upper flight bar, traveling at a differential velocity, then contacts the front, or back, surface of the product and "rolls" it into an upright position atop the elevated slat. The slat is then lowered to the level of the infeed conveyor surface as the upper flight travels up and away from the product. The disadvantage to this technique when upending very soft rolls of tissue is that the bottom edge of the roll may become deformed as the product is "rolled" up. The deformed end presents an unstable platform for the upended product, and it therefore tends to fall over.

Certain prior art stacking methods loaded rolls of tissue into an elevating cassette of shelves in either cores-up or cores-down orientation. When one shelf was loaded completely, the elevator would index to the height of the next shelf and the process would repeat. To insure a smooth loading operation, the vertical distance between the shelves of the cassette had to be somewhat greater than the size of the incoming product, and a vertical gap would therefore exist between the layers of product in the cassette. Upon completion of the loading process, with the cassette in the uppermost position, the collator paddle would travel forward, thus clearing the collated bundle from the stacker cassette. During this process the aforementioned vertical gap would allow the upper products to fall down upon the product from the lower shelve(s). As a result, the product would occasionally bounce, thus un-collating the bundle.

SUMMARY OF THE INVENTION

The invention utilizes a pair of rotatable star wheels. The upstream star wheel separates the incoming product into groups of one or more products for each lane or row of incoming products and feeds the groups of products to a downstream star wheel. The product is cradled in notches or pockets in the upstream star wheel and is always supported in a stable manner. The upstream star wheel can stack groups in two or more levels by indexing two or more times before the downstream star wheel indexes. The levels are stacked directly on top of each other without any gaps. When the downstream star wheel indexes, the products are upended, and the delivery mechanism moves the products away from the downstream star wheel. The product is not deformed by the upending process, and the upended product is stable.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
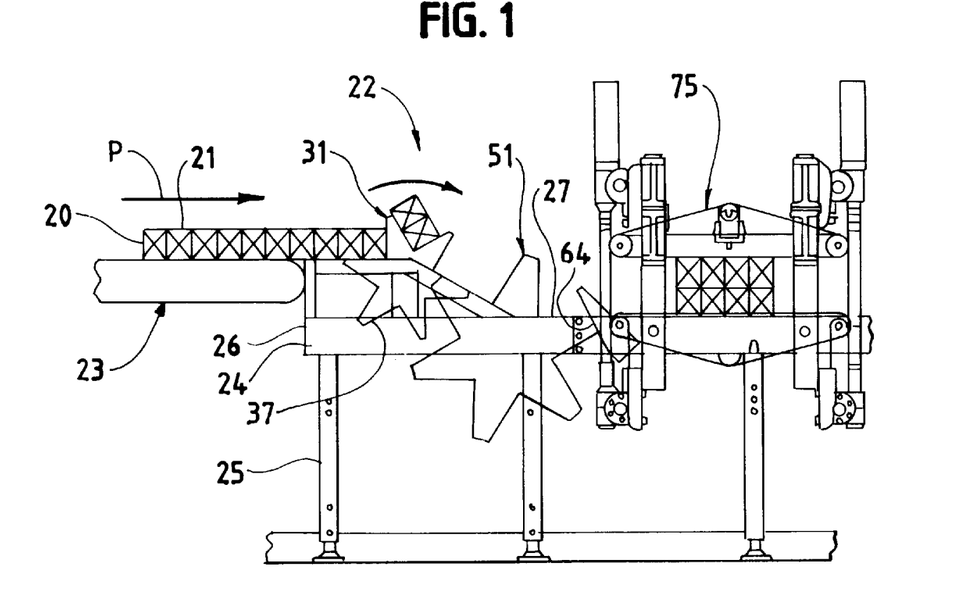
FIG. 1 is a side view of an infeed apparatus for feeding groups of products, for example, rolls of toilet paper, to a collator.
Figure 8:
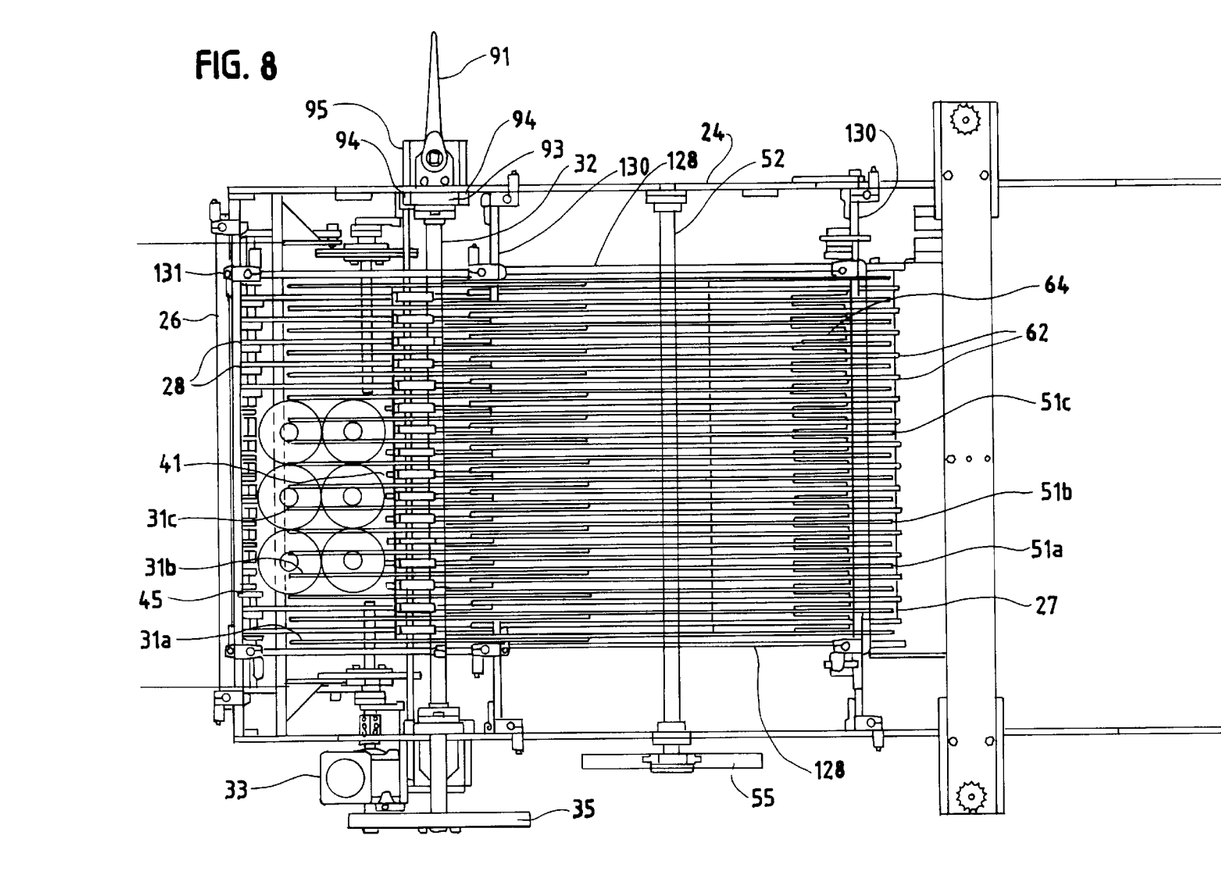
FIG. 8 is a top plan view of the infeed apparatus of FIG. 7.

Referring to FIG. 1, a row 20 of individual products 21 is advanced along a path P toward an infeed apparatus 22 by an infeed conveyor 23. The infeed conveyor can feed multiple rows or lanes of product to the infeed apparatus. For example, FIG. 8 illustrates three lanes of product.

The particular products illustrated in FIG. 1 are rows of toilet paper or bathroom tissue. However, it will be understood that the invention can be used with a wide variety of products.

The infeed apparatus includes a frame 24 which is supported by legs 25. The frame has an infeed or upstream end 26 and a discharge or downstream end 27. A plurality of horizontally extending product support slats or rails 28 (see also FIG. 8) are mounted on the infeed end of the frame for receiving product from the infeed conveyor. The product support slats are spaced apart transversely with respect to the path or direction in which the products are advanced.

An upstream star wheel 31 is rotatably mounted on the frame for rotation about a horizontal axis which extends transversely to the path of the products. As can be seen in FIG. 8, the upstream star wheel is actually a plurality of transversely spaced star wheel segments 31a, 31b, 31c, etc. which are interleaved with the product support slats 28. The star wheel segments are mounted on the an axle 32 and are rotated or indexed clockwise by an AC servo motor 33. A drive belt 34 (FIG. 7) connects the drive shaft of the servo motor to a pulley 35 on the axle 32.

The star wheel 31 includes six tines 37 which extend radially from the axle 32. Each tine includes a pair of outwardly converging side edges 38 (FIG. 7) which form a product-receiving pocket or notch 39 between each pair of adjacent tines. In the embodiment illustrated, the tine edges which form each pocket extend perpendicularly to each other.

At each index position of the upstream star wheel, one of the side edges of a tine is aligned with the product support slats 28 (see, for example, FIG. 1). One or more products can therefore be fed by the infeed conveyor 23 into a pocket of the star wheel.

An adjustable stop block 41 (FIG. 7) is attached to the top face of each of the product support slats 28 to stop the incoming products after the desired number of products enters the star wheel so that the next upstream product does not overlie the tip of the star wheel. That prevents the star wheel from contacting the upstream product when the star wheel indexes. Each stop block includes an elongated slot, and a machine screw extends through the slot into a tapped hole in the top surface of a product support slot. The stop blocks can be adjusted by loosening the screws and sliding the stop blocks forward or backward as desired.

A plurality of reciprocating hold-back fingers 45 (FIG. 7) are mounted on the frame between the product support slats 28. When the servo motor indexes the star wheel 31, the fingers are moved to the vertical position illustrated in FIG. 7 to hold back the upstream product while the tine of the star wheel indexes clockwise. After the tine indexes, the hold-back fingers reciprocate to a lowered position to allow additional products to advance to the star wheel.

The reciprocating hold-back fingers 45 travel vertically in response to actuation by a cam, which is driven by the servo motor 33. Since optimal control of the servo motor is achieved at rotational speeds much higher than the infeed system requires, the output shaft of the servo motor is coupled directly to a speed reducing gear box. A timing pulley 46 is mounted on the output shaft of the gearbox. Timing belt 34 is utilized to couple this pulley with the timing pulley 35 for the star wheel 31. This arrangement provides a 6:1 drive ratio. For each revolution of the gear box output shaft, the star wheel rotates 60 degrees, i.e., one star wheel tine per gear box revolution.

The hold-back finger actuating cam is also affixed to the gear box output shaft. A cam follower bearing is affixed to one end of link 47 which is spring loaded against the perimeter of the cam. Link 47 is rotatably affixed to the machine framing so that as the cam lifts the follower, the opposite end of link 47 pulls down on link 48 thus lowering the fingers 45. The fingers are mounted to a simple structure which is constrained to move vertically by linear bearings.

The mechanism makes use of the links 47 and 48 because of clearance requirements within the machine. The finger assembly could be coupled directly in other ways. Further, the finger assembly could also be actuated by other means, e.g., pneumatically, if an appropriate control system were utilized.

FIG. 1 illustrates the upstream star wheel 31 just before indexing clockwise. During each indexing movement, the star wheel rotates to bring the next tine into alignment with the path of products which are advanced by the conveyor 23. In FIG. 1 two products from each lane or row are indexed by the star wheel 31.

The upstream star wheel 31 acts as a choke for metering the proper number of products per lane and advancing those products to a downstream star wheel 51. The downstream star wheel 51 also includes a plurality of star wheel segments 51a, 51b, 51c, etc. (FIG. 8) which are mounted on an axle 52 which extends parallel to, and below, the axle 32. The axle 52 is rotated or indexed clockwise by an AC servo motor 53 (FIG. 7), a drive belt 54, and a pulley 55 on the end of the axle. The drive belt 54 is driven by a gear 56 which is rotated by the servo motor.

The star wheel 51 includes six tines 57 which extend radially from the axle 52. Each tine includes a pair of outwardly converging side edges 58 which form a product-receiving pocket or notch 59 between each pair of adjacent tines. The tine edges which form each pocket extend substantially perpendicularly. In one specific embodiment the tine edges formed an included angle of 94°, which provided a larger operating window between tines and allowed metering and collating taller pre-packed rolls.

Referring to FIG. 8, each of the segments of the downstream star wheel 51 is just slightly axially offset from a segment of the upstream star wheel 31. The tines on the downstream side of the star wheel 31 and the tines on the upstream side of the star wheel 51 overlap in a direction which extends parallel to the path in which the products are advanced by the infeed conveyor 23. Accordingly, as the upstream star wheel 31 indexes, product will be transferred from the upstream star wheel to the downstream star wheel (compare FIGS. 1–3).

Referring again to FIG. 8, a plurality of horizontally extending product support slats or rails 62 are mounted on the discharge end of the frame 24. The segments of the downstream star wheel 51 are interleaved with the slats 62. At each index position of the downstream star wheel, one of the side edges of a tine is substantially aligned with the discharge slat 62, and product can be moved away from the star wheel along the slats.

Figure 4:
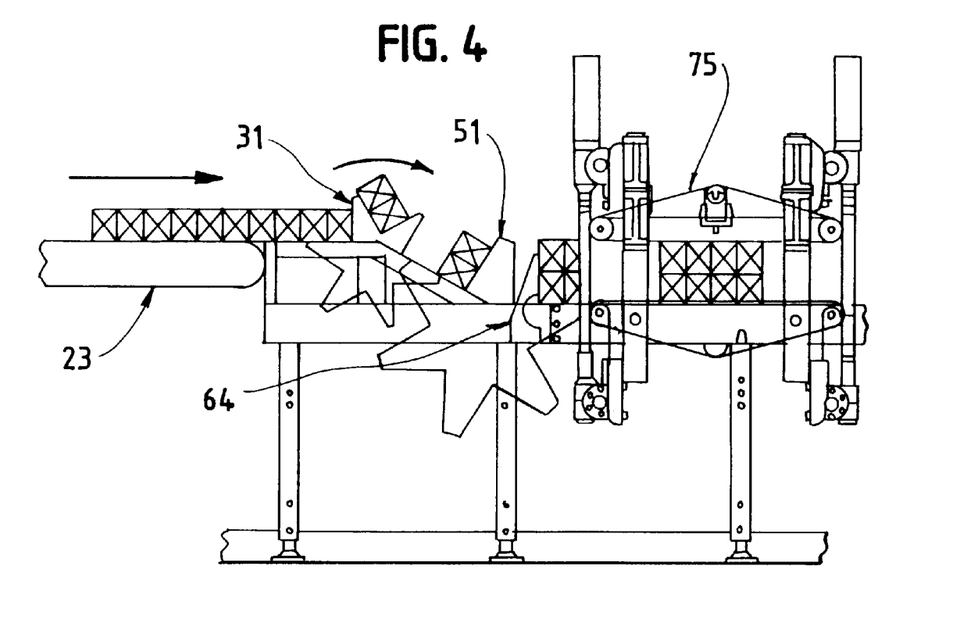
FIG. 4 illustrates a stack being moved away from the downstream star wheel toward the collator.
Figure 5:
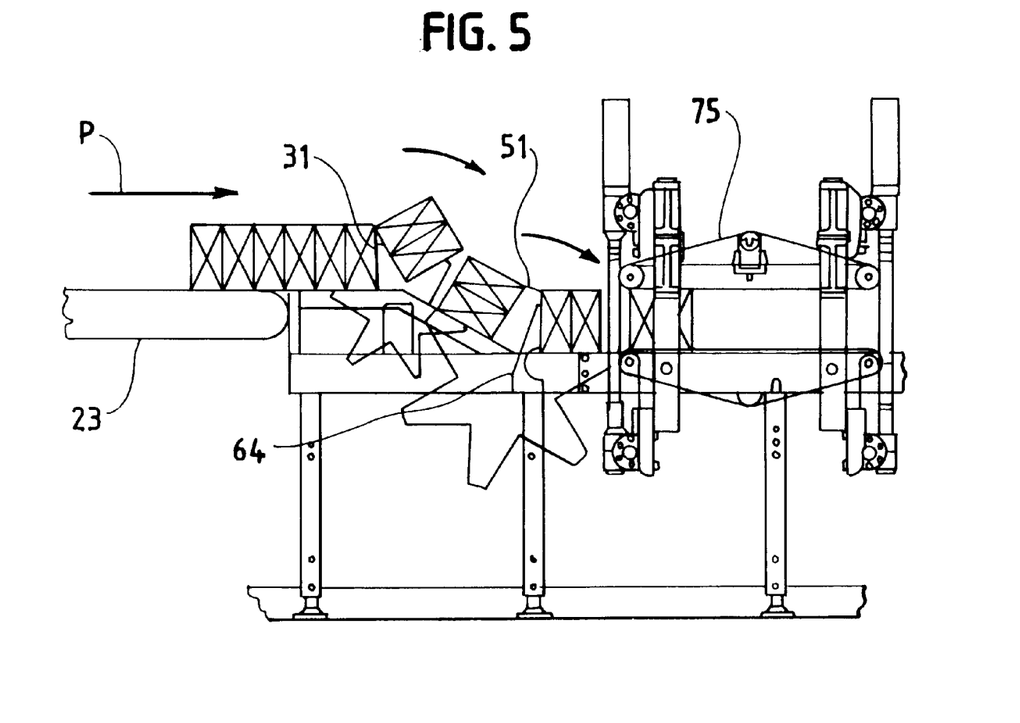
FIG. 5 is a view similar to FIG. 1 in which taller products, for example, rolls of paper towels, are being fed to the collator.
Figure 6:
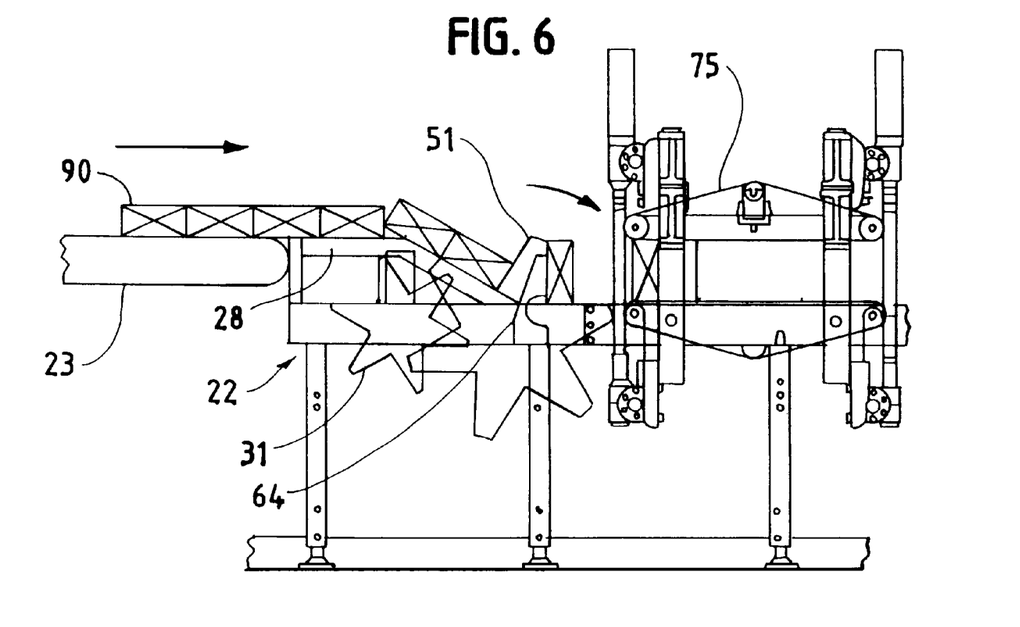
FIG. 6 illustrates the upstream star wheel in a lowered position so that products are fed directly to the downstream star wheel.

A plurality of reciprocating transfer fingers 64 (FIG. 7) are mounted on the frame between the discharge slats 62. The transfer fingers 64 are positioned below the product support slats 62 when the downstream star wheel indexes (see FIGS. 2 and 3). When product is to be discharged from the downstream star wheel, the reciprocating fingers are moved upwardly so that the downstream edge of each finger is aligned vertically with a vertically extending tine of the star wheel (FIGS. 5 and 6). The transfer fingers are then moved in a downstream direction to move the products away from the star wheel and over the slats 62 (FIG. 4).

Figure 7:
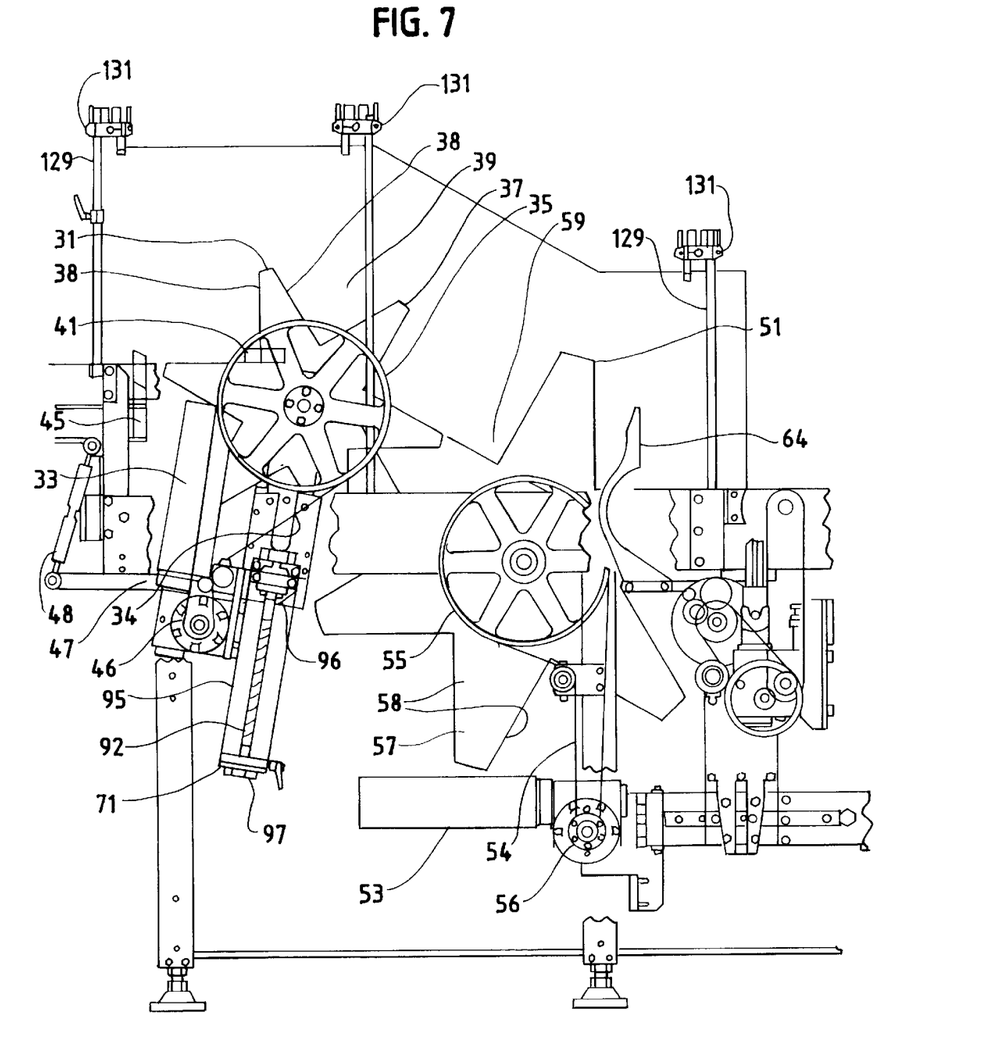
FIG. 7 is an enlarged fragmentary side view of the infeed apparatus.
Figure 15:
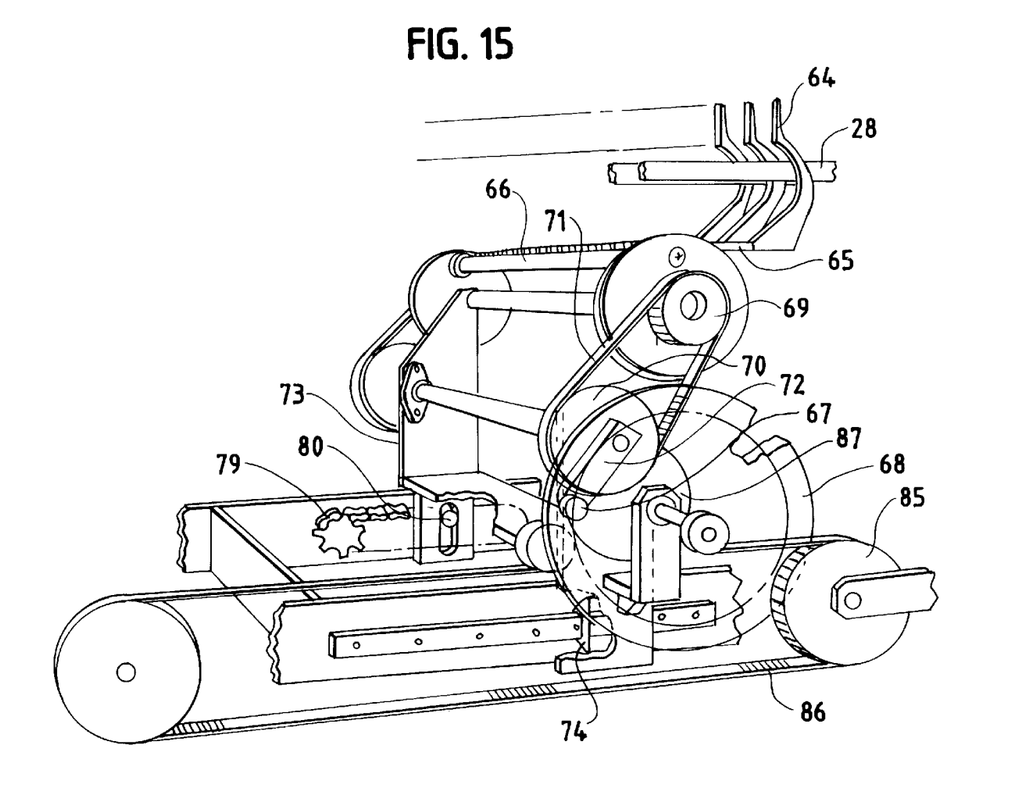
FIGS. 15 and 16 are fragmentary perspective views of the mechanism which drives the transfer fingers.
Figure 16:
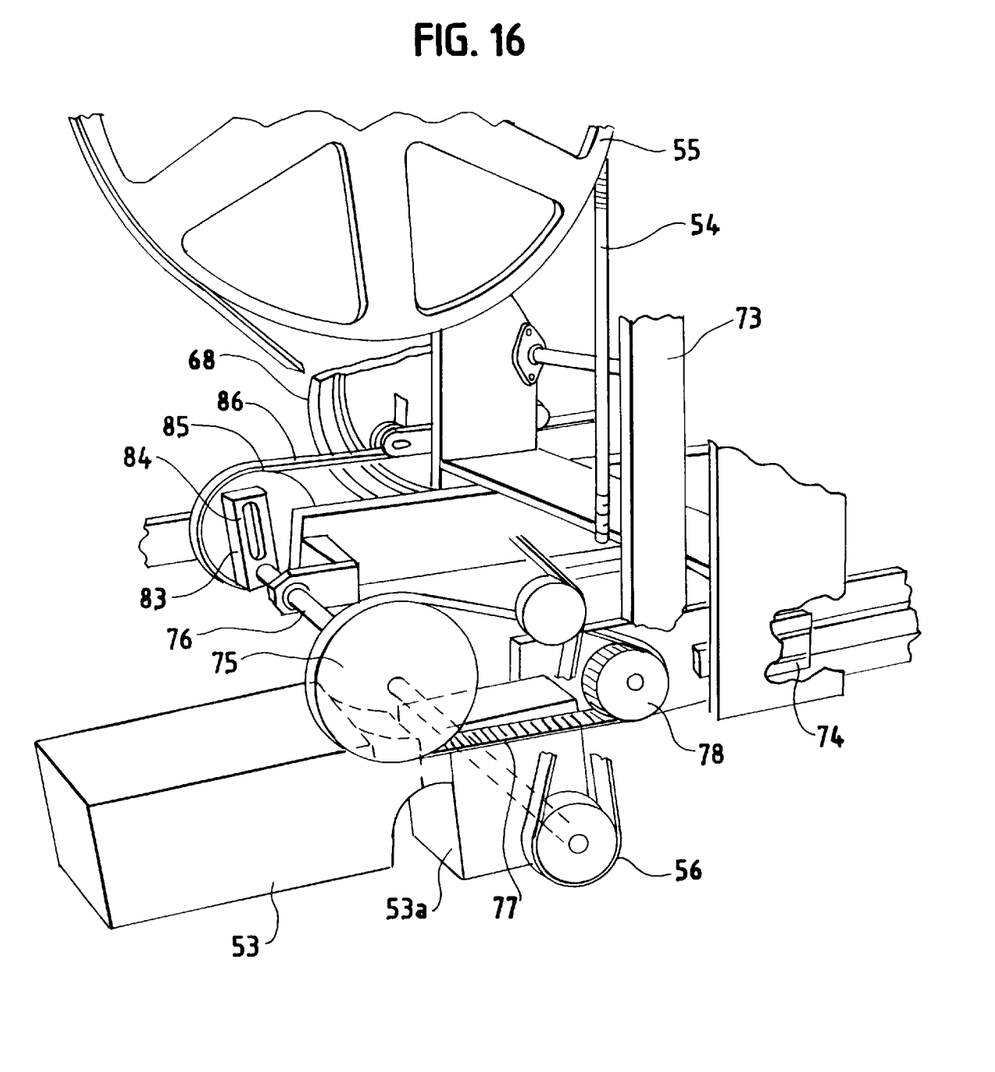

FIGS. 15 and 16 illustrate the mechanism for driving the transfer fingers. FIG. 16 shows the same side of the infeed apparatus which is illustrated in FIG. 7. FIG. 15 illustrates the opposite side.

The fingers 64 include horizontal extensions 65 which are attached to a pivoting shaft 66 which is located several inches forward of the fingers and below the horizontally extending product support slats 28. The pivot shaft 66 is connected to a reducing gear train which is driven by a cam 68. The gear train includes upper and lower timing pulleys 69 and 70 and belt 71. A cam follower 67 is affixed to an arm 72 which is mounted on the shaft for the lower timing pulley 70. The cam follower extends into a slot on the inside surface of the cam 68.

This entire assembly is mounted on an independent carriage frame work 73 which is constrained to move forward and backward and is supported by linear bearings 74. The motion of the carriage assembly as well as the rotation of the finger pivoting cam 68 is controlled by the servo drive 53.

The star wheel 51 is driven in the same manner as the star wheel 31 by a servo motor 53, gear reducer 53a, and 1:6 timing belt/pulley combination 54, 55. A second timing pulley 75 is affixed to the output shaft 76 of the gear box 53a. A timing belt 77 connects pulley 75 to another pulley 78 on a parallel shaft and drives a horizontal loop of roller chain 79. A cam follower bearing 80 affixed to the chain engages a vertical slot in the carriage frame work 73 for reciprocating the carriage as the chain 79 moves. The timing pulley ratio and chain length/sprocket combinations utilized are such that the chain loop makes one complete circuit for each revolution of the output shaft 76 of the servo gear box. It follows that the carriage 73 (with attached fingers 64) makes one complete trip forward and back for each tine advance of the star wheel 51.

Also affixed to the output shaft 76 of the servo motor gear box is an eccentric drive mechanism which drives the finger pivoting cam 68. This eccentric drive consists of a slotted plate 83 affixed to the end of the gear box output shaft 76 into which a cam follower bearing 84 is engaged. The cam follower 84 is fixed to the side of a timing pulley 85 and is spaced from the center of the pulley. The centerlines or axes of the gearbox output shaft 72 and the shaft of the timing pulley 85 are parallel and are spaced an eccentric distance apart so that as the slotted plate 83 revolves, the cam follower 84 (which drives the timing pulley 85) is driven about the centerline of the gearbox output shaft. The eccentricity forces the cam follower 84 to traverse the length of the slot once for each revolution. The result is that, although the timing pulley 85 revolves once per star wheel tine, its rotational speed is not constant. In fact, at the point where the cam follower 84 reaches the end of the slot nearest the centerline of the gear box output shaft, the timing pulley 85, and mating belt 86, almost stop. Conversely, when the cam follower 84 is at the far end of the slot, the pulley 85, and hence the timing belt 86, are moving at a higher than average velocity. When the motions of the carriage 73 and belt 86 are correctly timed, the carriage and belt move forward at approximately the same speed. As the carriage returns, the speed of timing belt 86 reduces to near zero.

The belt 86 drives a pulley 87 attached to the cam 68 which controls the up/down motion of the fingers 64. The ratios of the pulleys 85 and 87 are selected so that as the carriage 73 moves forward, the cam 68 does not rotate, and during the return move of the carriage 73, the cam 68 makes one full revolution by moving backwards as the belt 86 is held stationary.

The required motion could be produced by other means such as pneumatically or with additional servo axes. The particular mechanical arrangement described is advantageous because the finger pivot shaft and star wheel tines must, at different times, occupy the same physical space. This mechanical drive insures that these components cannot interfere during normal operation.

Stacking and Upending

Figure 2:
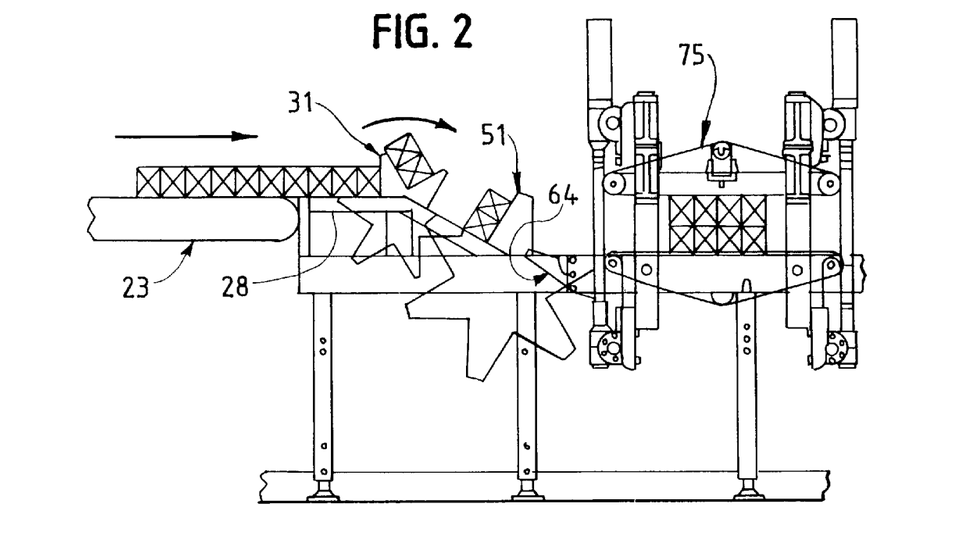
FIG. 2 is a view similar to FIG. 1 showing a subsequent step in the feeding operation in which the upstream star wheel is in the process of stacking a second group of products on the downstream star wheel.

FIGS. 1–4 illustrate the manner in which a plurality of products can be stacked and upended (inverted) by the two star wheels. In FIG. 1 the upstream or choke star wheel 31 is about to index clockwise to pass two products per lane to the downstream star wheel 51. In FIG. 2 the upstream star wheel is about to index again to pass two more products per lane to the downstream star wheel 51. The upstream star wheel can therefore index twice before the downstream star wheel indexes in order to stack products two high. If desired, products could also be stacked three high or higher by indexing the upstream star wheel the appropriate number of times before indexing the downstream star wheel.

Figure 3:
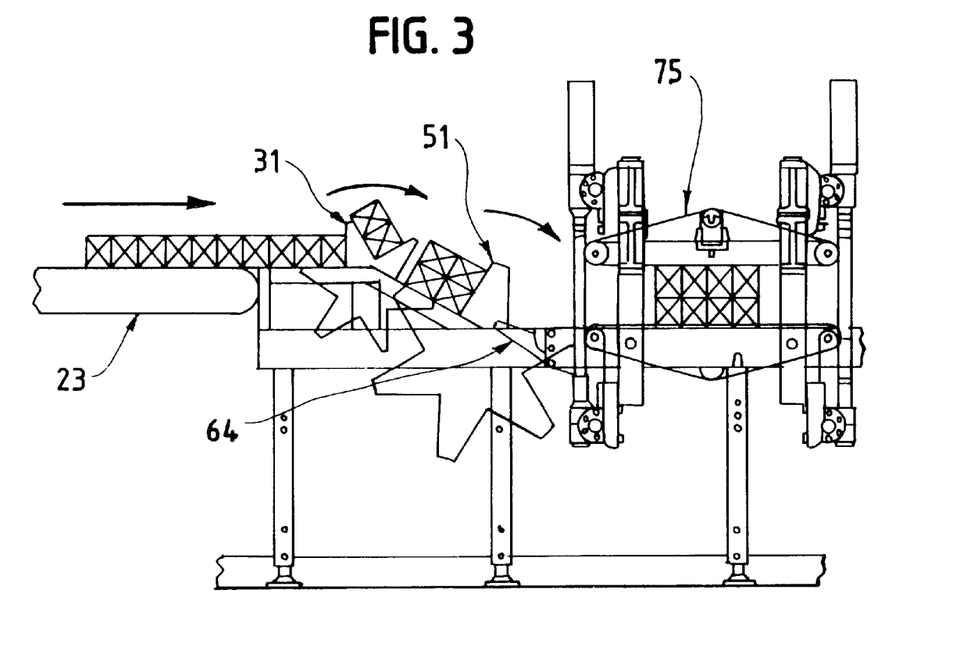
FIG. 3 is a similar view in which a stack of two groups of products is about to be upended by the downstream star wheel.

In FIG. 3 the downstream star wheel 51 is about to index clockwise. Products in the downstream star wheel have been rotated about 120° from their position on the infeed conveyor 23. When the downstream star wheel indexes, the stack of products is passed to the discharge support slats 62, and each product is rotated 180° from its position on the infeed conveyor. FIG. 4 illustrates the two high stack being moved away from the downstream star wheel by the transfer fingers 64.

If it is desired to feed products without stacking them, the upstream or choke star wheel 31 indexes once for each index of the downstream star wheel 51. The products are inverted by the downstream star wheel but are not stacked.

If the products in FIGS. 1–4 are rolls of toilet paper, they may be advanced by the infeed conveyor 23 in a cores-up orientation, i.e., the cardboard cores of the rolls are positioned so that the axes of the cores are vertical. The rolls will be upended by the star wheels and will be returned to a cores-up configuration.

Cores-Down to Cores-Up

For some products it is desirable to rotate a product only 90°. For example, rolls of paper towels are more easily conveyed in a cores-down orientation in which the axes of the elongated cores extend horizontally.

FIG. 6 illustrates the infeed apparatus 22 configured to move rolls 90 of paper towels from a cores-down position to a cores-up position. The upstream star wheel 31 is lowered so that the tines thereof do not extend above the infeed product support slats 28. Referring to FIGS. 7 and 8, the upstream star wheel can be lowered by a ratchet handle 91 which operates a ball screw 92 to lower the star wheel 32.

The star wheel 31, axle 32, servo motor 33, timing belt, and pulleys are mounted on an independent frame work 93. This entire assembly is slidably affixed to the infeed frame side plates 24 on each side of the machine infeed by gibs 94 (FIG. 8). An additional frame member 95 is affixed to each infeed frame side plate 24 and extends downward and slightly upstream. The ball screw 92 is mounted to the lower end of each additional frame 95 and engages a ball nut 96 mounted on the star wheel frame 93. A small chain sprocket 97 is affixed to the lower end of each ball screw, and the two sprockets are connected by a chain loop. The ratchet handle 91 is connected to one of the ball screws, and is operable to lower the choke assembly from the upper position to the lower position as shown in FIGS. 5 and 6.

The rolls 90 of paper towels are advanced by the infeed conveyor 23 along the support slats 28 all the way to the downstream star wheel 51. In the embodiment illustrated in FIG. 6, one roll per lane is metered into the downstream star wheel. As the downstream star wheel indexes, each roll is rotated into a cores-up orientation, and the transfer fingers 64 then move the cores-up rolls away from the downstream star wheel.

Collation Section

Figure 9:
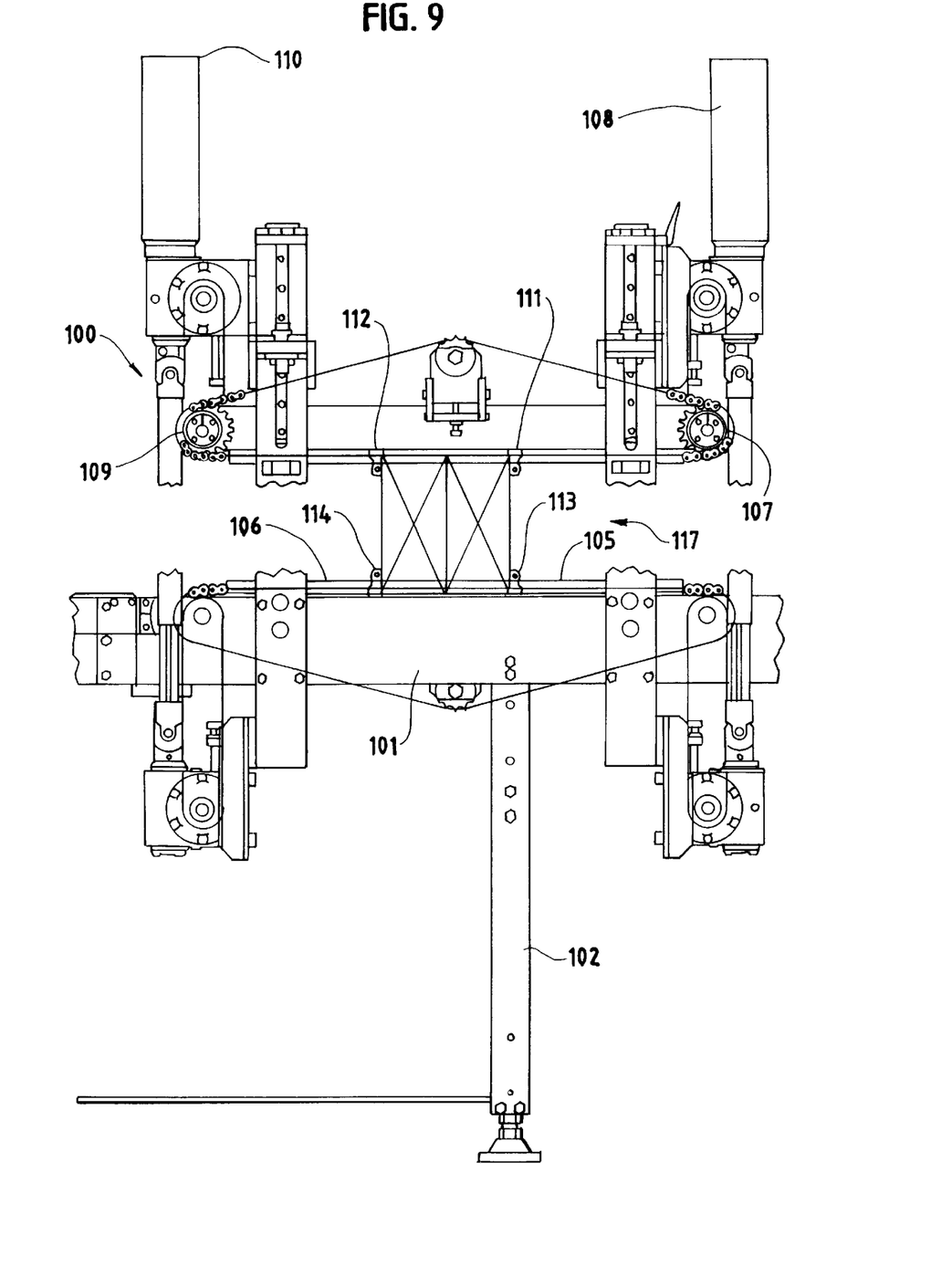
FIG. 9 is an enlarged fragmentary side view of the collator.
Figure 10:
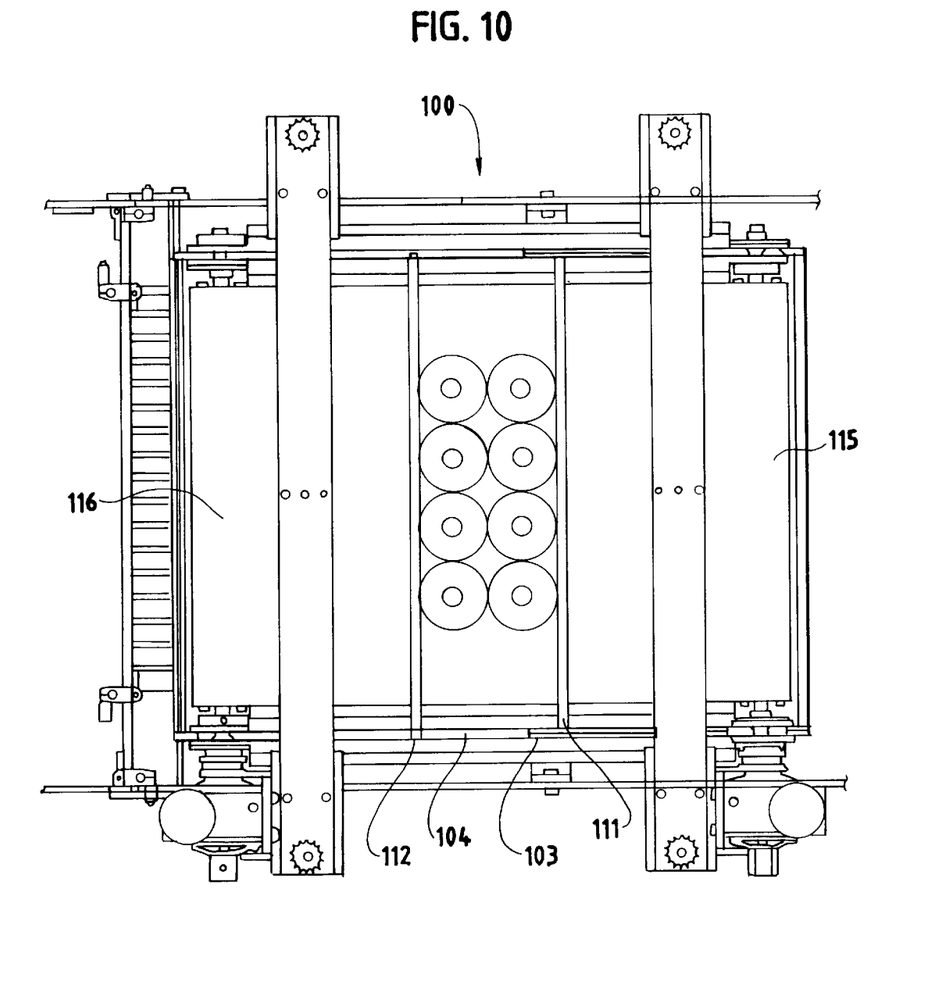
FIG. 10 is a top plan view of the collator of FIG. 9.

The products are delivered by the reciprocating transfer fingers 64 to a collation section 100 (FIGS. 9 and 10). A frame 101 is supported by a support leg 102, and the frame supports a pair of upper conveyor chains 103 and 104 on each side of the frame and a pair of lower conveyor chains 105 and 106 on each side of the frame. The upper conveyor chains 103 are driven by leading or downstream sprockets 107 which are rotated by an AC leading servo drive 108. The upper conveyor chains 104 are driven by trailing or upstream sprockets 109 which are rotated by a trailing servo drive 110.

The lower conveyor chains 105 are also driven by the leading servo drive 108, and the lower conveyor chains 106 are driven by the trailing servo drive 110.

A transversely extending upper leading flight bar 111 is attached to the upper conveyor chains 103, and a transversely extending upper trailing flight bar 112 is attached to the upper conveyor chains 104. Similarly, a transversely extending lower leading flight bar 113 is attached to the lower conveyor chains 105, and a transversely extending lower trailing flight bar 114 is attached to the lower conveyor chains 106.

A horizontal support plate 116 is mounted on the frame between the two pairs of lower conveyor chains. The reciprocating transfer fingers 64 advance each group of products from the downstream star wheel over the discharge product support slats 62 and onto the horizontal support plate 116 of the collation section. The products are confined between the support plate 116 and a matching upper plate above the product. As each group of products is introduced to the collation section, it is trapped against the upper and lower leading flight bars 111 and 113. The leading servo 108 is operated to advance the leading flight bars as additional groups of products are introduced into the collation section. Once the appropriate number of groups of products is advanced into the collation section to form the desired bundle, the trailing servo operates to advance the upper and lower trailing flight bars 112 and 114 to capture the upstream end of the bundle. While the bundle is trapped between the leading and trailing flights, the servos are operated to advance the flights to transfer the collated bundle through a conventional funneling area 117 in the downstream end of the collation section in order to compress the bundle.

The leading flight bars serve to prevent unstable products from tipping forward accidentally, resulting in machine jams. The use of paired upper and lower leading and trailing flights, combined with suitable side guides, affords six-sided control of the product. This is important for transporting the bundle to the loader section, especially with products having a high length-to-diameter ratio such as house hold towel rolls.

Loader Section

Figure 11:
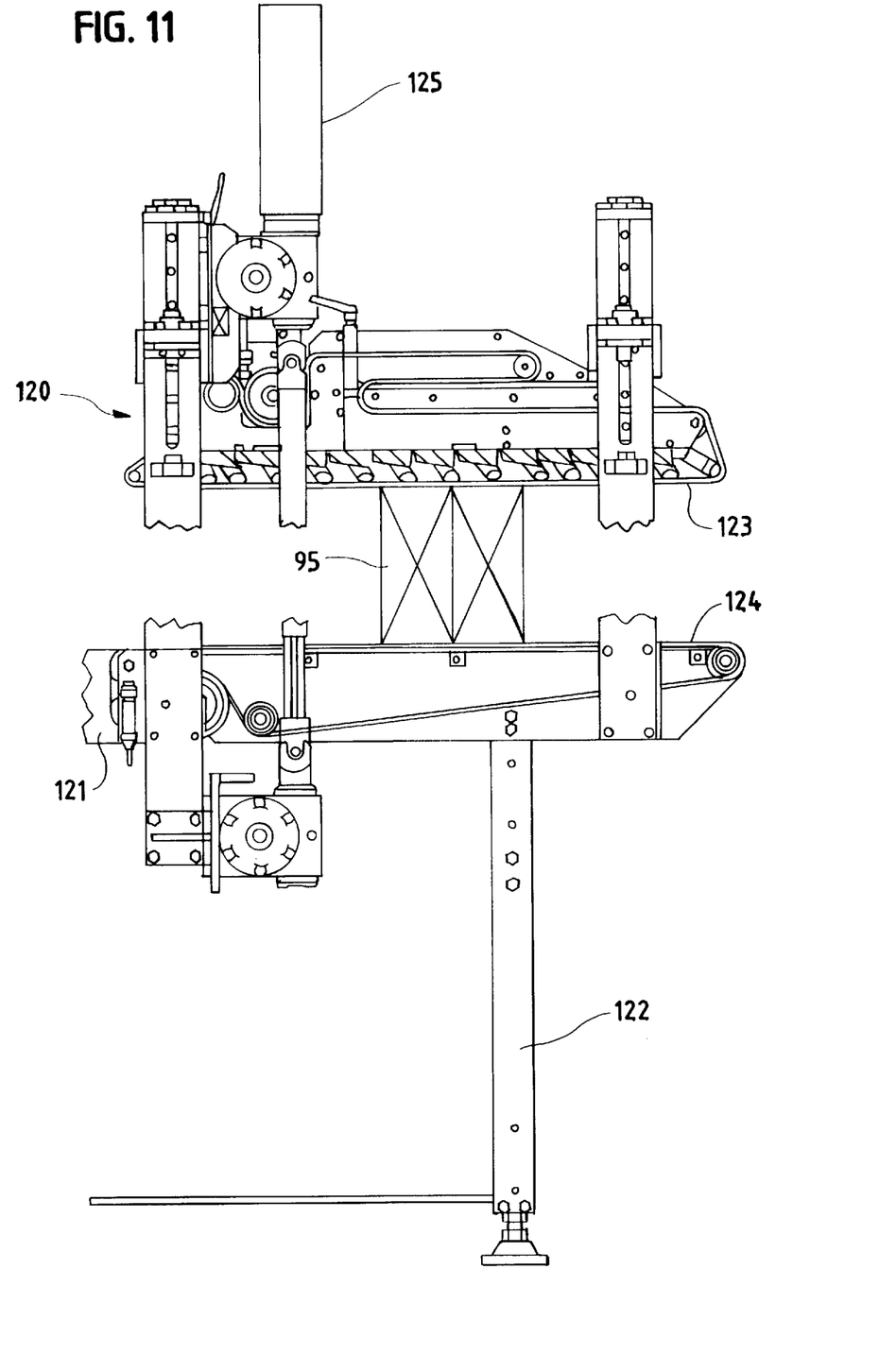
FIG. 11 is a fragmentary side view of a loader which is downstream of the collator.
Figure 12:
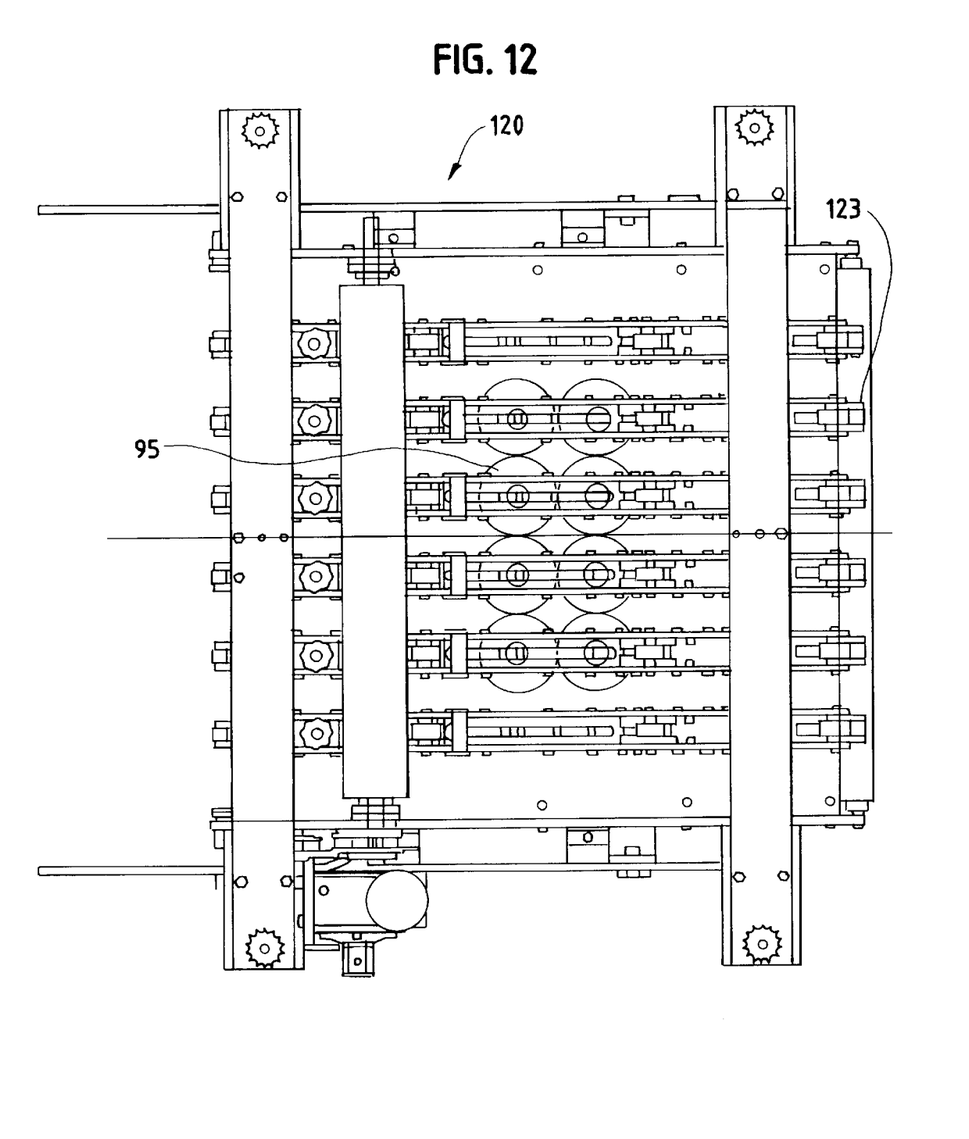
FIG. 12 is a top plan view of the loader of FIG. 11.

The collated and compressed bundle is delivered from the collation section 100 to a loader section 120 (FIGS. 11 and 12). A frame 121 is supported by a support leg 122 and supports a plurality of transversely spaced upper loader belts 123 and a single full width lower loader belt 124. All of the loader belts are driven by an AC servo drive 125.

The upper and lower loader belts above and below the bundle of products captures the bundle and controls the bundle as it is advanced toward the downstream end of the loader section. The loader section may be used to transfer the bundle to a conventional packaging machine which wraps the bundle in an outer wrap of polyethylene or other conventional packaging material and seals the outer wrap.

Product Guides

Throughout the processes of metering stacking, collating, and loading, the rolls are prevented from falling sideways out of the machine by suitable side guides. The infeed conveyor 23 is equipped with conventional UHMW polyethylene strips which are sold under the name Valu-Guide and which guide each lane of product delivered to the machine. Guide plates 128 (FIG. 7), fabricated from clear polycarbonate sheet, are utilized in the infeed apparatus 22. Since the infeed section of the machine is laneless, the products are presented converged. These plates are therefore used only to guide the extreme sides of the outer product lanes. These plates are positioned directly above the horizontally extending product support slats 28 and can be relocated laterally as the number of lanes is changed.

Each guide plate is supported by vertical support tubes 129 (FIG. 7) which are mounted on the frame 24 and horizontal support tubes 130 (FIG. 8) which extend across the width of the machine. Clamps or brackets 131 for supporting the guide plates are slidably mounted on the horizontal tubes 130.

In operation the products are cradled in the star wheel notches as well as guided by these plates. While only the two outer lanes contact the plates, the inner lanes contact each other, affording improved stability. Four sides of the product are therefore supported as the product is moved by the star wheels. For a brief period of time as the products are passed between the star wheels, the products are supported by the support slats (and/or one edge of the star wheel notches) and by the side guides, or by the adjacent products in the case of the middle lanes, thus affording three-sided contact.

The collation and loader sections also make use of UHMV polyethylene guide strips which also guide the extreme edges of the collated product.

Package Configurations

Figure 13A:
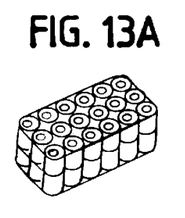
FIGS. 13A through 13E illustrate representative packages of toilet paper rolls which can be formed by the foregoing equipment.
Figure 13B:
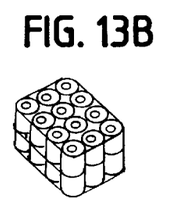
Figure 13C:
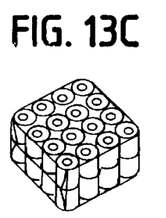
Figure 13D:
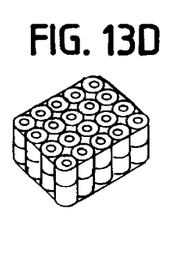
Figure 13E:
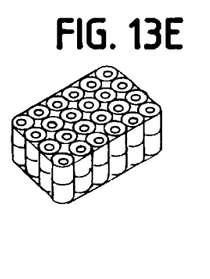

FIGS. 13A through 13E illustrate representative packages of toilet paper rolls which can be formed by the infeed apparatus 22 and subsequently handled by the collation section, loader section, and packaging machine. FIG. 13A illustrates a bundle of 36 rolls which are stacked two high. FIG. 13B illustrates a package of 24 rolls, FIG. 13C illustrates a package of 32 rolls, FIG. 13D illustrates a package of 40 rolls, and FIG. 13E illustrates a package of 48 rolls. A variety of other package configurations are also possible.

Figure 14A:
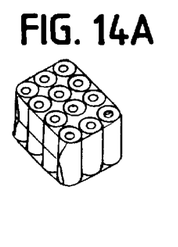
FIGS. 14A through 14D illustrate representative packages of paper towel rolls which can be formed by the foregoing equipment.
Figure 14B:
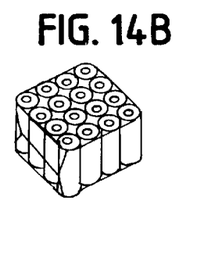
Figure 14C:
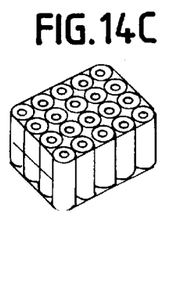
Figure 14D:
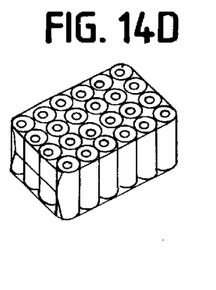

FIGS. 14A through 14D illustrate representative packages of paper towel rolls which can be formed by the infeed apparatus. FIG. 14A illustrates a package of 12 rolls of paper towels packaged in a cores-up orientation. FIG. 14B illustrates a package of 15 paper towels, FIG. 14C illustrates a package of 20 paper towels, and FIG. 14D illustrates a package of 24 paper towels. Other configurations are also possible.

The preferred embodiment of the infeed apparatus utilizes two star wheels, each having six points or tines. Other configurations could be used if desired. For example, either or both of the star wheels could have four, five, or seven tines. However, we have found that the six point configuration accommodates the largest number of pre-packed configurations as well as the greatest degree of product size and density variation.

Although the upstream and downstream star wheels are driven through independent AC servo drives, the upstream star wheel could be linked to the downstream star wheel through a simple mechanical drive.

The star wheels cradle the product in the notches or pockets of the star wheels, and the products are always contacted on at least three adjacent sides. The product is therefore not deformed by the upending process, and the product is therefore more stable once upended.

The star wheels stack tiers of products directly on top of each other without any gaps. The absence of gaps between the stacked tiers makes the stack more stable.

While in the foregoing specification a detailed description of specific embodiments of the invention were set forth for the purpose of illustration, it will be understood that many of the details herein given can be varied considerably by those skilled in the art without departing from the spirit and scope of the invention.

We claim:

1. Apparatus for feeding products from a row of products which are being advanced along a path comprising:

means for advancing a row of products along a path having an upstream end and a downstream end, a first star wheel mounted for rotation about a first axis which extends transversely to said path, the first star wheel including a plurality of tines which extend outwardly from said first axis, each pair of adjacent tines providing a product-receiving pocket for receiving at least one product from said row of products and for rotating the product with respect to said first axis as the first star wheel rotates, a second star wheel mounted for rotation about a second axis which extends parallel to said first axis and which is spaced downstream from the first axis, the second star wheel including a plurality of tines which extend radially outwardly from said second axis, each pair of adjacent tines providing a product-receiving pocket for receiving at least one product from the first star wheel and for rotating the product with respect to said second axis as the second star wheel rotates, each of said star wheels having an upstream side and a downstream side, the tines on the upstream side of the second star wheel being located adjacent the tines on the downstream side of the first star wheel and the lengths of the tines of the first star wheel and the lengths of the tines of the second star wheel being such that the tines of the first star wheel overlap the tines of the second star wheel whereby products carried by the tines of the first star wheel are transferred to the tines of the second star wheel, and means for moving products carried by the tines of the second star wheel in a downstream direction away from the second star wheel.

2. The apparatus of claim 1 in which said second axis is positioned below said first axis.

3. The apparatus of claim 1 in which each of said star wheels includes six tines.

4. The apparatus of claim 1 including means for supporting the row of products as the products are advanced toward the first star wheel and stop means adjustably mounted on the support means for varying the number of products which can move from said row of products into the pocket provided by the times of the first star wheel.

5. The apparatus of claim 1 including means for restraining movement of said row of products toward the first star wheel.

6. The apparatus of claim 1 including first indexing means for intermittently indexing the first star wheel whereby product in each pocket of the first star wheel is delivered to a pocket of the second star wheel, and second indexing means for intermittently indexing the second star wheel whereby product in each pocket of the second star wheel is moved downstream from the first star wheel, the first indexing means indexing the first star wheel twice while the second indexing means indexes the second star wheel once whereby product from two pockets of the first star wheel are delivered to each pocket of the second star wheel.

7. The apparatus of claim 1 including first drive means for rotating the first star wheel and second drive means for rotating the second star wheel independently of the first star wheel.

8. The apparatus of claim 1 in which each of the tines of the first star wheel has a pair of side edges and each of the tines of the second star wheel has a pair of side edges, a side edge of one of the tines of the first star wheel being aligned with a side edge of one of the tines of the second star wheel when a product is transferred from the tines of the first star wheel to the tines of the second star wheel.

9. Apparatus for feeding products from a row of products which are being advanced along a path comprising:

means for advancing a row of products along a path having an upstream end and a downstream end, a first star wheel mounted for rotation about a first axis which extends transversely to said path, the first star wheel including a plurality of tines which extend outwardly from said first axis, each pair of adjacent tines providing a product-receiving pocket for receiving at least one product from said row of products and for rotating the product with respect to said first axis as the first star wheel rotates, a second star wheel mounted for rotation about a second axis which extends parallel to said first axis and which is spaced downstream from the first axis, the second star wheel including a plurality of tines which extend radially outwardly from said second axis, each pair of adjacent tines providing a product-receiving pocket for receiving at least one product from the first star wheel and for rotating the product with respect to said second axis as the second star wheel rotates, each of said star wheels having an upstream side and a downstream side, the tines on the upstream side of the second star wheel being located adjacent the tines on the downstream side of the first star wheel whereby products carried by the tines of the first star wheel are transferred to the tines of the second star wheel, and means for moving products carried by the tines of the second star wheel in a downstream direction away from the second star wheel, said means for moving products away from the second star wheel comprising a reciprocating transfer finger.

10. The apparatus of claim 9 including drive means for rotating said second star wheel and for reciprocating said transfer finger.

11. Apparatus for feeding products from a row of products which are being advanced along a path comprising:

means for advancing a row of products along a path having an upstream end and a downstream end, a first star wheel mounted for rotation about a first axis which extends transversely to said path, the first star wheel including a plurality of tines which extend outwardly from said first axis, each pair of adjacent tines providing a product-receiving pocket for receiving at least one product from said row of products and for rotating the product with respect to said first axis as the first star wheel rotates, a second star wheel mounted for rotation about a second axis which extends parallel to said first axis and which is spaced downstream from the first axis, the second star wheel including a plurality of tines which extend radially outwardly from said second axis, each pair of adjacent tines providing a product-receiving pocket for receiving at least one product from the first star wheel and for rotating the product with respect to said second axis as the second star wheel rotates, each of said star wheels having an upstream side and a downstream side, the tines on the upstream side of the second star wheel being located adjacent the tines on the downstream side of the first star wheel whereby products carried by the tines of the first star wheel are transferred to the tines of the second star wheel, and means for moving products carried by the tines of the second star wheel in a downstream direction away from the second star wheel, each product being rotated 180° as it is rotated by the first and second star wheels.

12. Apparatus for feeding products from a row of products which are being advanced along a path comprising:

means for advancing a row of products along a path having an upstream end and a downstream end, a first star wheel mounted for rotation about a first axis which extends transversely to said path, the first star wheel including a plurality of tines which extend outwardly from said first axis, each pair of adjacent tines providing a product-receiving pocket for receiving at least one product from said row of products and for rotating the product with respect to said first axis as the first star wheel rotates, a second star wheel mounted for rotation about a second axis which extends parallel to said first axis and which is spaced downstream from the first axis, the second star wheel including a plurality of tines which extend radially outwardly from said second axis, each pair of adjacent tines providing a product-receiving pocket for receiving at least one product from the first star wheel and for rotating the product with respect to said second axis as the second star wheel rotates, each of said star wheels having an upstream side and a downstream side, the tines on the upstream side of the second star wheel being located adjacent the tines on the downstream side of the first star wheel whereby products carried by the tines of the first star wheel are transferred to the tines of the second star wheel, means for moving products carried by the tines of the second star wheel in a downstream direction away from the second star wheel, and a frame having an infeed end and a discharge end which are in said path, a plurality of product support slats mounted on the infeed end of the frame and being spaced apart in a direction transverse to said path, a plurality of product support slats mounted on the discharge end of the frame and being spaced apart in a direction transverse to said path, the first star wheel including a plurality of axially spaced wheel segments which are interposed between the product support slats at the infeed end, the second star wheel including a plurality of axially spaced wheel segments which are interposed between the product support slats at the discharge end.

13. The apparatus of claim 12 in which said means for moving products away from the second star wheel comprises a plurality of reciprocating transfer fingers which are interposed between the product support slats at the discharge end of the frame.

14. The apparatus of claim 13 including drive means for the transfer fingers for maintaining the transfer fingers below the product support slats when the second star wheel indexes, for extending the transfer fingers above the product supports slats, and for moving the transfer fingers in a downstream direction to move product away from the second star wheel.

15. Apparatus for feeding products from a row of products which are being advanced along a path comprising:

means for advancing a row of products along a path having an upstream end and a downstream end, a main frame, a second frame movably mounted on the main frame for movement perpendicular to said path, a first star wheel mounted on the second frame for rotation about a first axis which extends transversely to said path, the first star wheel including a plurality of tines which extend outwardly from said first axis, each pair of adjacent tines providing a product-receiving pocket for receiving at least one product from said row of products and for rotating the product with respect to said first axis as the first star wheel rotates, a second star wheel mounted on the main frame for rotation about a second axis which extends generally parallel to said first axis and which is spaced downstream from the first axis, the second star wheel including a plurality of tines which extend radially outwardly from said second axis, each pair of adjacent tines providing a product-receiving pocket for receiving at least one product from the first star wheel and for rotating the product with respect to said second axis as the second star wheel rotates, each of said star wheels having an upstream side and a downstream side, the tines on the upstream side of the second star wheel being located adjacent the tines on the downstream side of the first star wheel whereby products carried by the tines of the first star wheel are transferred to the tines of the second star wheel, and means for moving products carried by the tines of the second star wheel in a downstream direction away from the second star wheel.

16. The apparatus of claim 15 including means for lowering the second frame relative to the main frame so that the first star wheel is below said path and said means for advancing a row of products advances the product to the second star wheel.

17. The apparatus of claim 15 including a plurality of spaced-apart product support slats on the main frame downstream from the second star wheel, said means for moving products away from the second star wheel including a plurality of reciprocating transfer fingers which are interposed between the product support slots.

18. The apparatus of claim 17 including drive means for the transfer fingers for maintaining the transfer fingers below the product support slats when the second star wheel indexes, for extending the transfer fingers above the product supports slats, and for moving the transfer fingers in a downstream direction to move product away from the second star wheel.

19. Apparatus for feeding products from a row of products which are being advanced along a path comprising:

means for advancing a row of products along a path having an upstream end and a downstream end, a first star wheel mounted for rotation about a first axis which extends transversely to said path, the first star wheel including a plurality of tines which extend outwardly from said first axis, each pair of adjacent tines providing a product-receiving pocket for receiving at least one product from said row of products and for rotating the product with respect to said first axis as the first star wheel rotates, a second star wheel mounted for rotation about a second axis which extends parallel to said first axis and which is spaced downstream from the first axis, the second star wheel including a plurality of tines which extend radially outwardly from said second axis, each pair of adjacent tines providing a product-receiving pocket for receiving at least one product from the first star wheel and for rotating the product with respect to said second axis as the second star wheel rotates.

each of said star wheels having an upstream side and a downstream side, the tines on the upstream side of the second star wheel being located adjacent the tines on the downstream side of the first star wheel whereby products carried by the tines of the first star wheel are transferred to the tines of the second star wheel, means for moving products carried by the tines of the second star wheel in a downstream direction away from the second star wheel, and means for moving the first star wheel below said path so that said means for advancing a row of products advances the product to the second star wheel.

20. Apparatus for feeding products from a row of products which are being advanced along a path comprising:

means for advancing a row of products along a path having an upstream end and a downstream end, a first star wheel mounted for rotation about a first axis which extends transversely to said path, the first star wheel including a plurality of tines which extend outwardly from said first axis, each pair of adjacent tines providing a product-receiving pocket for receiving at least one product from said row of products and for rotating the product with respect to said first axis as the first star wheel rotates, a second star wheel mounted for rotation about a second axis which extends parallel to said first axis and which is spaced downstream from the first axis, the second star wheel including a plurality of tines which extend radially outwardly from said second axis, each pair of adjacent tines providing a product-receiving pocket for receiving at least one product from the first star wheel and for rotating the product with respect to said second axis as the second star wheel rotates, each of said star wheels having an upstream side and a downstream side, the tines on the upstream side of the second star wheel being located adjacent the tines on the downstream side of the first star wheel whereby products carried by the tines of the first star wheel are transferred to the tines of the second star wheel, means for moving products carried by the tines of the second star wheel in a downstream direction away from the second star wheel, and a collation apparatus which is located downstream from the feeding apparatus, the collation apparatus comprising a collation frame having an upstream end and a downstream end, upper and lower leading flight bars movably mounted on the collation frame for movement parallel to the upstream and downstream direction, upper and lower trailing flight bars movably mounted on the collation frame for moving parallel to the upstream and downstream direction, first drive means for moving the leading flight bars independently of the trailing flight bars, and second drive means for moving the trailing flight bars independently of the leading flight bars.

* * * * *